(12) United States Patent
Hamilton et al.

(10) Patent No.: US 7,530,088 B2
(45) Date of Patent: May 5, 2009

(54) TOPOLOGY BASED PROXIMITY VALIDATION FOR BROADCAST CONTENT

(75) Inventors: Scott Eric Hamilton, Los Angeles, CA (US); Stefan Nusser, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 11/162,713

(22) Filed: Sep. 20, 2005

(65) Prior Publication Data

US 2007/0067817 A1    Mar. 22, 2007

(51) Int. Cl.
*H04N 7/18* (2006.01)
*H04N 7/16* (2006.01)

(52) U.S. Cl. ............... 725/85; 725/74; 725/81; 725/25

(58) Field of Classification Search ............ 725/74, 725/81, 85
See application file for complete search history.

(56) References Cited

U.S. PATENT DOCUMENTS

| | | | |
|---|---|---|---|
| 5,036,537 A | 7/1991 | Jeffers et al. | |
| 6,009,116 A | 12/1999 | Bednarek et al. | |
| 6,292,568 B1 | 9/2001 | Akins, III et al. | |
| 7,246,366 B1 * | 7/2007 | Addington et al. | 725/93 |
| 7,376,976 B2 * | 5/2008 | Fierstein et al. | 726/27 |
| 2003/0126594 A1 | 7/2003 | Tsuria et al. | |
| 2003/0165241 A1 | 9/2003 | Fransdonk | |
| 2003/0233540 A1 | 12/2003 | Banerjee et al. | |
| 2004/0093614 A1 * | 5/2004 | Sakurai et al. | 725/25 |
| 2005/0086532 A1 | 4/2005 | Lotspiech et al. | |
| 2005/0097595 A1 * | 5/2005 | Lipsanen et al. | 725/25 |
| 2005/0166223 A1 * | 7/2005 | Krasinski | 725/35 |

FOREIGN PATENT DOCUMENTS

| WO | WO 2004080074 A1 * | 9/2004 |
|---|---|---|
| WO | WO 2005029858 A1 * | 3/2005 |

* cited by examiner

*Primary Examiner*—John W Miller
*Assistant Examiner*—Chris Parry
(74) *Attorney, Agent, or Firm*—IP Authority, LLC; Ramraj Soundararajan

(57) ABSTRACT

A system and method of controlling redistribution of broadcast content within a personal area network using TSID-DMA mapping to localize devices, wherein some location-aware devices have the capability to derive region identifiers whereas other location agnostic devices localize themselves by adopting the DMA of the first broadcast content received. Rules for redistribution of broadcast content between devices are also established.

18 Claims, 3 Drawing Sheets

TOPOLOGY BASED PROXIMITY VALIDATION FOR BROADCAST CONTENT

BACKGROUND OF THE INVENTION

The present invention relates generally to the field of broadcasting. More specifically, the present invention is related to controlling redistribution of broadcast content.

DISCUSSION OF PRIOR ART

The FCC has mandated that ATSC (Advanced Television Systems Committee) digital broadcast content that is marked with the broadcast flag has to be protected inside the receiving home if it is stored or shared among multiple networked devices. The objective of this rule is to prevent live redistribution of broadcast content over the Internet which would break down the existing geographic portioning of receivers into digital marketing areas (DMA) based on the broadcast station they are serviced by.

This geographic portioning of broadcast content is leveraged by the broadcasting industry to enable a number of business models. For example, commercials might be customized for a particular DMA, or a premium sports event might be blacked out for local broadcast receivers to encourage people to attend the event in person. The FCC's broadcast flag mandate attempts to maintain these business models in the presence of networked set-top boxes (STB) and CE devices.

Known prior art solutions to prevent live redistribution involve the enforcement of physical proximity at the network layer. In such solutions, broadcast content that is introduced into the home network can only be shared with devices that are physically close to the receiving STB. This is difficult to accomplish and enforce because the underlying network protocol (TCP/IP) is designed to hide the characteristics of physical networks it is layered on. One way to enforce physical proximity is to set the time-to-live (TTL) field in the IP header to a small value such as 3 and thereby limiting the number of routers between sender and receiver. Another mechanism that is currently under discussion would be to impose a limit on the round trip time of IP packets.

There are several drawbacks of these proposals. Setting TTL field to 3 is easy to circumvent since there are no integrity guarantees at that layer—any router or gateway could easily modify the TTL field. The problem with limiting the round trip time is that the round trip time between two devices depends not only on their physical proximity but also on variable factors such as the overall network load.

U.S. patent application 2005/0086532, assigned to IBM, describes an alternative way of localizing premium content in a home network that is based on the network topology. The approach described in this patent application uses strong cryptography to enforce certain rules if the network topology changes. The application was focused on premium content (e.g. HBO) which is typically introduced into the home by a cable or satellite STB. The STB which acts as a content source knows the geography (e.g. zip code) that it is associated with. With premium content, this is a valid assumption since there needs to be a subscription of some kind before the end user can start receiving the content. However, this assumption is not true for broadcast content. There is no need for a subscription in order to receive broadcast content. An STB that acts only as an ATSC receiver without having cable or satellite TV functionality has no subscription identifier and therefore no associated billing address and ZIP code.

Furthermore, IBM has extended the broadcast encryption techniques used for protection of content stored on portable media to the networked environment by developing a content protection system referred to as xCP (extensible content protection), that allows consumers to seamlessly access content within their home, while at the same time protecting the rights of content owners. In particular, IBM's "xCP cluster protocol" binds protected content to a dynamic cluster of networked recording and playback devices, such that the content can be managed on those devices under a single protection scheme independent of particular storage or transmission interfaces and protocols.

The following patents and patent application publications provide for the controlling of delivery of content based on location of devices.

U.S. patent assigned to General Instrument Corp., (U.S. Pat. No. 5,036,537), describes a method to black out receivers in a direct broadcast satellite system based on having separate transaction with each individual receiver before starting the broadcast.

U.S. patent assigned to Philip A Rubin and Associates, Inc., (U.S. Pat. No. 6,009,116), illustrates a method to descramble video signals only if the receiver decoder is at an authorized location.

U.S. patent assigned to Scientific-Atlanta, Inc., (U.S. Pat. No. 6,292,568), discusses a cable television system wherein service instances are encrypted using public and/or private keys provided by service providers or central authorization agents.

U.S. patent application to Tsuria et al., (2003/0126594 A1), describes a method to black out receivers in a certain region until either a time or financial constraint is met.

U.S. patent application to Fransdonk, (2003/0165241 A1), describes how to deliver content over a regular network. A backchannel is assumed so it applies to the Internet and not to broadcasting. Geographical localization is done by IP address and billing address of the customer.

U.S. patent application to Banerjee et al., (2003/0233540 A1), describes a secure channel switching technology in a multicast environment.

The prior art fails to provide for a simple solution for controlling the redistribution of broadcast content wherein the physical proximity is not enforced at the network layer.

Whatever the precise merits, features, and advantages of the above cited references, none of them achieves or fulfills the purposes of the present invention.

SUMMARY OF THE INVENTION

The present invention provides for a method to control the retransmission of broadcast content in a personal area network, wherein a receiver receives a first broadcast stream, extracts a transport stream identifier from the stream, derives a region identifier based on the transport stream identifier, and retransmits the broadcast content to one or more devices residing in the same region. The region identifier is added to the retransmitted content.

The present invention provides for a receiver to control the retransmission of broadcast content in a personal area network, wherein the receiver comprises an extracting unit, a memory unit and a region identifier deriving unit. The receiver receives a first broadcast stream. An extracting unit extracts a transport stream identifier from the stream and the region identifier deriving unit derives a region identifier based on the transport stream identifier and a TSID-to-DMA mapping table. The receiver retransmits the broadcast content to one or more devices residing in the same region. The region identifier is added to the retransmitted content.

The present invention provides for a method to retransmit broadcast content to one or more networked devices in a personal area network, wherein the networked devices receive a first retransmitted broadcast content from a receiver. The receiver receives a first broadcast stream, extracts a transport stream identifier from the stream, derives a region identifier based on the transport stream identifier, and retransmits the broadcast content to one or more networked devices residing in the same region. The region identifier is added to the retransmitted content. Location agnostic networked devices (without digital broadcast capabilities) are associated to a region by adopting the region identifier from the retransmitted broadcast content. This association permits the devices to play the retransmitted broadcast content only from the first region. Location aware networked devices (having digital broadcast capabilities) determine their region by independently performing TSID-to-DMA mapping. These devices will only play retransmitted broadcast content from the receiver (location aware source) if the region associated with the content matches the region determined by performing the TSID-to-DMA mapping in the location aware networked device.

DESCRIPTION OF THE PREFERRED EMBODIMENTS

Figure 1:
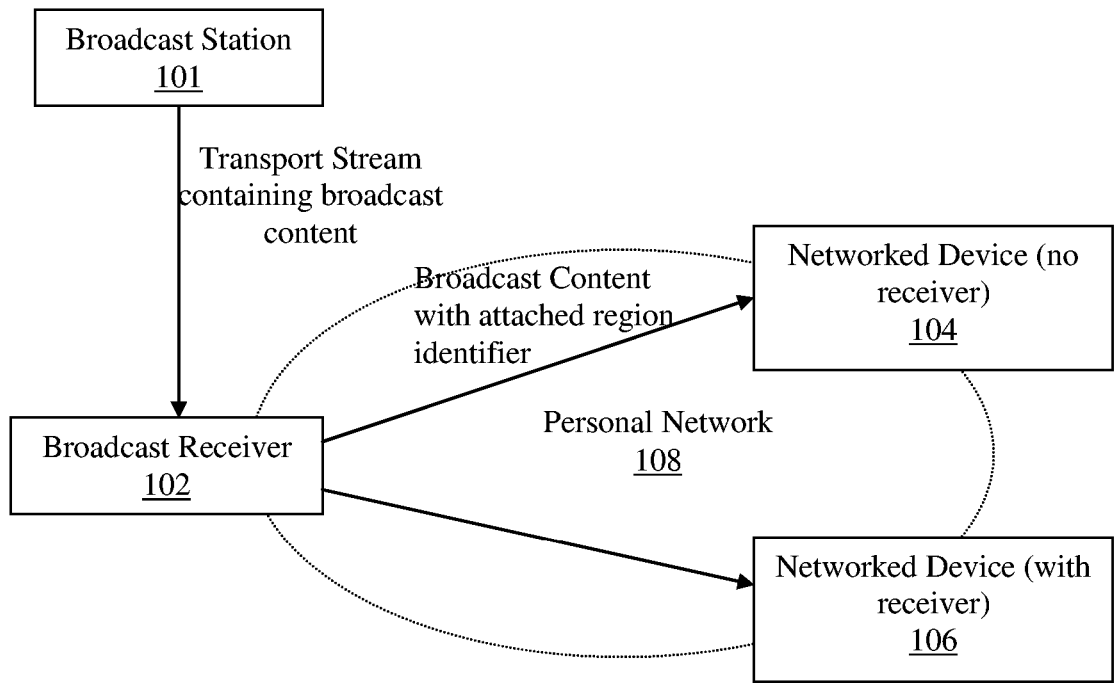
FIG. 1 illustrates a system for proximity control using TSIDs and DMAs, as per the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

TV stations in the U.S., including Digital TV stations, are licensed to operate in a community. For digital TV, these communities are listed in FCC regulations, CFR Title 47 part 73.622 Digital Television Table of Allotments. In the present invention, the channels listed in the table of allotments are mapped directly to TSIDs (transport stream identifier) because these are uniquely assigned to a station, and furthermore are directly related to the channel number (see ATSC A/65B, 6.3.1 Terrestrial Virtual Channel Table p. 32; EIA/CEA-608-B). Changes are made to this table from time to time, but all changes are a matter of public record. Analog signals may also include TSIDs in the vertical blanking interval.

The channels can also be mapped to a local market. Nielson Media Research places each TV station in a "Designated Market Area" (DMA) that is a collection of counties in which local stations have a significant audience. The federal government recognizes DMAs as defining local market in which a broadcaster operates for many legal purposes. In the present invention, a licensing agency or standards body maintains a mapping of TSIDs to DMAs and provides the TSID-to-DMA mapping table to all Digital TV stations for transmission to ATSC receivers.

FIG. 1 illustrates a system for proximity control using TSIDs and DMAs. The present invention uses information contained in the ATSC broadcast transport stream from a broadcast station 101, to determine the geographic location of a receiver 102 such as a set-top box (STB). This broadcast transport stream contains compressed broadcast content. In particular, the present invention teaches the use of TSID (transport stream identifier) information embedded in the MPEG stream in order to derive a region identifier (unique DMA). Using the TSID-to-DMA mapping table, a receiver can determine what region (DMA) a program is aired in. This region identifier would be identical for all STBs in the same area and it would be different for an STB that is located elsewhere. The STB attaches this broadcast region identifier to protected content in the personal home network 108. Protected broadcast content with an associated region identifier is referred to as protected localized content. An STB can enforce proximity by retransmitting only to other devices in the same DMA as the transmitter airing the program.

Based on the region identifier, networked devices 104, 106 are prevented from accepting protected content that originates from sources in different regions. A networked device 104 without a built-in broadcast receiver would associate itself with a given region once it first renders protected localized content and then refuse to play protected content from a different region. A networked device 106 with broadcast receiving capabilities would perform the TSID-to-DMA mapping and determine what region it is associated with. To enforce these rules a renewable content protection system such as xCP may be used. DTCP over IP system also provide for the required renewability characteristics (e.g., updated key management block, new certificate revocation list). Content protection systems such as xCP, DTCP over IP, or any DRM (Digital Rights management) related content protection scheme, could serve as the base system for the content localization mechanism of the present invention.

Figure 2:
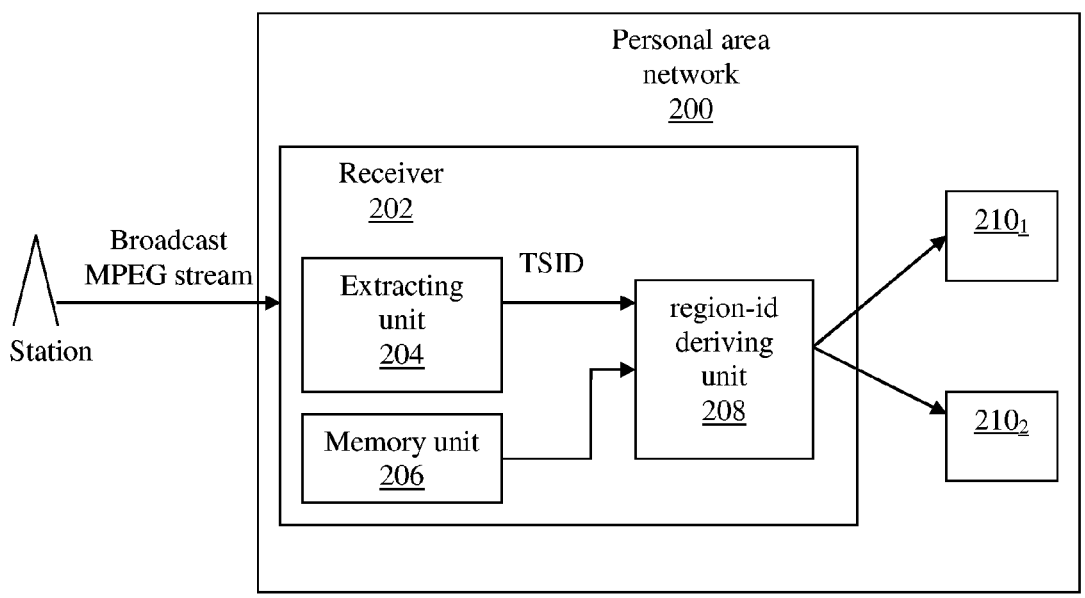
FIG. 2 illustrates a receiver controlling the retransmission of broadcast content, as per the present invention.

FIG. 2 illustrates a receiver controlling the retransmission of broadcast content. Protected broadcast content is introduced into the home network or personal area network 200 by an ATSC receiver 202. Receiver 202 comprises extracting unit 204, memory unit 206, and region identifier deriving unit 208. Extractor 204 extracts TSID information from the broadcast MPEG stream received from a broadcasting station. Memory 206 stores a TSID-to-DMA mapping table. Region identifier deriving unit 208 derives a region identifier, i.e. unique DMA, using the TSID information extracted from the MPEG stream and the TSID-to-DMA mapping table. This region identifier is permanently associated with the protected content while it is being transferred between networked devices $210_1$, $210_2$ and, optionally, while the content is stored. Any of the networked devices $210_1$, $210_2$ connected to home network 200 that want to render localized content need to associate themselves with the corresponding region (DMA) of receiver 202 they are connected to and only play protected content from that region. Receiver 202 is also referred to as a location-aware device because it is able to derive a region identifier. However, devices $210_1$, $210_2$ are referred to as location-agnostic devices as they need to associate themselves with the corresponding region of receiver 202. A personal area network may have more than one location-aware device. Any location-aware source is required to attach the region identifier to the protected content when retransmitting.

A networked device receiving the retransmitted content is only allowed to render it if the target devices' DMA matches the location-aware sources' DMA. Devices $210_1$, $210_2$ will receive content from receiver 202; however, any devices that belong to a different region will refuse to render its content.

Before rendering localized content from a different region, the networked device has to change the region it is associated with. Such a change is limited by rules. In one embodiment, the networked device can change the region it is associated with only a predetermined number of times. In an extended embodiment, the change requires explicit confirmation by the user. The purpose of these restrictions is to make it hard for a networked device to switch back and forth between different regions. The objective of these rules is for a networked device to be persistently associated with a region. The licensing agreement for the underlying content protection scheme can be used to impose these rules on the device manufacturers. If devices are produced that do not comply with these rules, the renewability feature of the underlying content protection system can be used to revoke the non-compliant devices.

Figure 3:
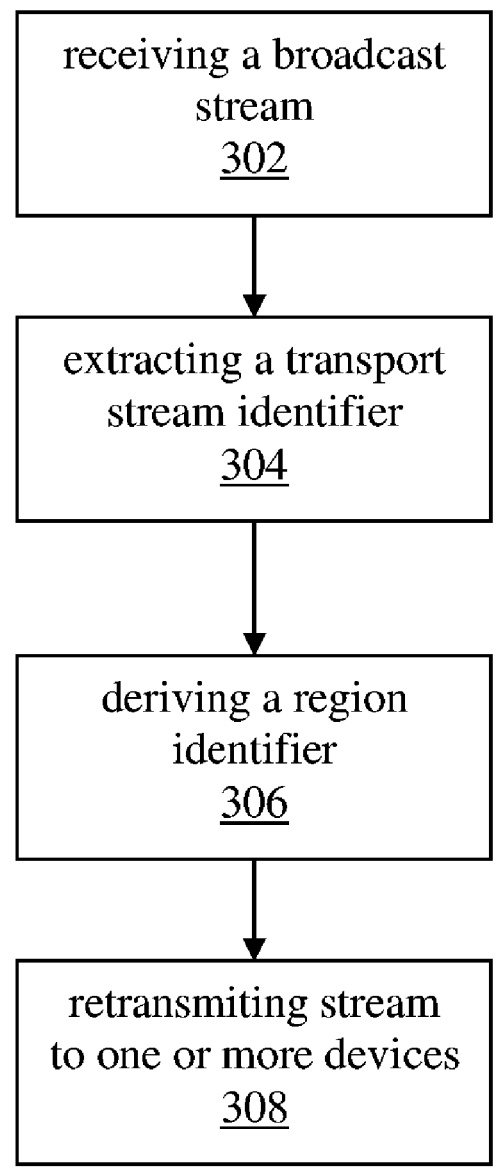
FIG. 3 illustrates the steps followed by the receiver to control the redistribution of content, as per the present invention.

FIG. 3 shows a flowchart 300 illustrating the steps followed by the receiver to control the redistribution of content in a personal area network. The receiver receives an ATSC broadcast stream in step 302. The transport stream identifier is extracted from the stream in step 304. In step 306, a region identifier is derived using the extracted transport stream identifier and a TSID-to-DMA mapping table. The receiver retransmits the broadcast content to one or more devices residing in the same region in step 308. The region identifier is added to the retransmitted broadcast content.

CONCLUSION

A system and method has been shown in the above embodiments for the effective implementation of a topology based proximity validation for broadcast content. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

What is claimed is:

1. A method to control the retransmission of broadcast content, said method comprising:
   receiving a broadcast stream containing broadcast content in a device that is part of a personal area network (PAN);
   extracting a transport stream identifier (TSID) from said broadcast stream;
   deriving a designated market area (DMA) from a TSID-to-DMA mapping table based on said transport stream identifier, said DMA indicating a region in which a program is aired;
   retransmitting said broadcast content to one or more devices residing in the same said region, said DMA added to said retransmitted broadcast content, said one or more devices belonging to said PAN, and said broadcast content playable in a given device in said PAN if DMA associated with said given device matches DMA added to said retransmitted broadcast content.

2. A method to control the retransmission of broadcast content, according to claim 1, wherein said broadcast content is protected when introduced into said personal area network using a DRM content protection scheme.

3. A method to control the retransmission of broadcast content, according to claim 2, wherein said DRM content protection scheme is xCP or DTCP over IP.

4. A method to control the retransmission of broadcast content, according to claim 1, wherein DMA associated with a device in said one or more devices is changed to DMA from said retransmitted broadcast content, said change only allowed up to a pre-determined number of times for any given device in said PAN.

5. A method to control the retransmission of broadcast content, according to claim 1, wherein said program is a television program.

6. A method to control the retransmission of broadcast content, according to claim 1, wherein said content relates to local events, said local events being sports events and concerts.

7. A method to control the retransmission of broadcast content, according to claim 1, wherein said stream is a MPEG stream.

8. A receiver to control the retransmission of broadcast content in a personal area network, said receiver comprising:
   an extracting unit extracting a transport stream identifier (TSID) from a received broadcast stream;
   a memory unit storing a TSID-to-DMA mapping table, said TSID-to-DMA mapping table mapping extracted TSIDs with corresponding designated market areas (DMAs);
   a region identifier deriving unit deriving a DMA corresponding to said extracted TSID, said DMA indicating a region in which a program is aired; and
   said receiver retransmitting broadcast content to one or more devices residing in the same said region, said DMA added to said retransmitted broadcast content, said one or more devices belonging to a personal area network (PAN), said broadcast content playable in a given device in said PAN if a DMA associated with said given device matches DMA added to said broadcast content.

9. A receiver to control the retransmission of broadcast content, according to claim 8, wherein said broadcast content is protected when introduced into said personal area network using a DRM content protection scheme.

10. A receiver to control the retransmission of broadcast content, according to claim 9, wherein said DRM content protection scheme is xCP or DTCP over IP.

11. A receiver to control the retransmission of broadcast content, according to claim 8, wherein DMA associated with a device in PAN is changed to DMA from said retransmitted broadcast content, said change allowed only up to a pre-determined number of times for any given device in said PAN.

12. A receiver to control the retransmission of broadcast content, according to claim 8, wherein said program is a television program.

13. A receiver to control the retransmission of broadcast content, according to claim 8, wherein said content relates to local events, said local events being sports events and concerts.

14. A receiver to control the retransmission of broadcast content, according to claim 8, wherein said stream is a MPEG stream.

15. A method to retransmit broadcast content to one or more networked devices in a personal area network, said method comprising:
   receiving first retransmitted broadcast content by said one or more networked devices in a personal area network (PAN) from a receiver, said one or more networked devices comprising location aware devices and location agnostic devices, said receiver receiving a broadcast stream containing broadcast content, extracting a transport stream identifier (TSID) from said broadcast stream, deriving a designated market area (DMA) from a TSID-to-DMA mapping table based on said transport stream identifier, said DMA indicating a region in which a program is aired, and retransmitting said broadcast content to said one or more devices residing in the same said region, said DMA being added to said retransmitted broadcast content;

associating said location agnostic devices in said PAN with said region by adopting said DMA from said first retransmitted broadcast content; wherein said association permits said location agnostic devices in said PAN to play said first retransmitted broadcast content only from said region and;

associating said location aware devices in said PAN with said region, wherein said location aware devices independently derive a DMA; and said association permits said location aware devices in said PAN to play said first retransmitted broadcast content only if said DMA derived by said receiver matches said DMA derived by said location aware devices.

16. A method to retransmit broadcast content to one or more devices networked in a personal area network, according to claim 15, wherein said program is a television program.

17. A method to retransmit broadcast content to one or more devices networked in a personal area network, according to claim 15, wherein said content relates to local events, said local events being sports events and concerts.

18. A method to retransmit broadcast content to one or more devices networked in a personal area network, according to claim 15, wherein said stream is a MPEG stream.

* * * * *